(12) United States Patent
Akahori et al.

(10) Patent No.: US 10,875,994 B2
(45) Date of Patent: Dec. 29, 2020

(54) RUBBER, SEAL COMPONENT, AND HOSE

(71) Applicant: TOYODA GOSEI CO., LTD., Kiyosu (JP)

(72) Inventors: Naoyuki Akahori, Kiyosu (JP); Hidekazu Kurimoto, Kiyosu (JP); Naoki Iwase, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 134 days.

(21) Appl. No.: 16/072,558

(22) PCT Filed: Dec. 8, 2016

(86) PCT No.: PCT/JP2016/086565
§ 371 (c)(1),
(2) Date: Jul. 25, 2018

(87) PCT Pub. No.: WO2017/168853
PCT Pub. Date: Oct. 5, 2017

(65) Prior Publication Data
US 2019/0031871 A1    Jan. 31, 2019

(30) Foreign Application Priority Data
Mar. 29, 2016 (JP) .................. 2016-065454

(51) Int. Cl.
| | |
|---|---|
| C08L 23/16 | (2006.01) |
| F16J 15/02 | (2006.01) |
| F16J 15/10 | (2006.01) |
| C08J 9/00 | (2006.01) |
| C09K 3/10 | (2006.01) |
| F16L 11/04 | (2006.01) |
| B60J 10/15 | (2016.01) |
| C08J 9/10 | (2006.01) |

(52) U.S. Cl.
CPC ............ *C08L 23/16* (2013.01); *C08J 9/0061* (2013.01); *C09K 3/10* (2013.01); *F16J 15/022* (2013.01); *F16J 15/027* (2013.01); *F16J 15/102* (2013.01); *B60J 10/15* (2016.02); *C08J 9/105* (2013.01); *C08J 2201/026* (2013.01); *C08J 2203/04* (2013.01); *C08J 2323/16* (2013.01); *C08J 2423/16* (2013.01); *C08J 2491/00* (2013.01); *C08L 2203/14* (2013.01); *C08L 2205/025* (2013.01); *C08L 2205/03* (2013.01); *C08L 2312/02* (2013.01); *F16L 11/04* (2013.01)

(58) Field of Classification Search
None
See application file for complete search history.

(56) References Cited

U.S. PATENT DOCUMENTS

| | | | | |
|---|---|---|---|---|
| 5,929,165 | A | * 7/1999 | Tasaka | ............... C08L 53/02 524/269 |
| 2009/0239014 | A1 | * 9/2009 | Noguchi | ............... C08K 3/22 428/36.8 |
| 2013/0303680 | A1 | * 11/2013 | Weaver | ............... C08L 23/16 524/528 |
| 2015/0275053 | A1 | 10/2015 | Iwase et al. | |

FOREIGN PATENT DOCUMENTS

| | | |
|---|---|---|
| JP | 56-118440 A | 9/1981 |
| JP | 07-145258 A | 6/1995 |
| JP | 10-221930 A | 8/1998 |
| JP | 2001-192488 A | 7/2001 |
| JP | 2002-80627 A | 3/2002 |
| JP | 2002-146074 A | 5/2002 |
| JP | 2005-36053 A | 2/2005 |
| JP | 4554059 B2 | 7/2010 |
| JP | 2011-11602 A | 1/2011 |
| JP | 2013136661 A | 7/2013 |
| JP | 2015-189865 A | 11/2015 |
| WO | 2016/199473 A1 | 12/2016 |

OTHER PUBLICATIONS

International Search Report of the International Searching Authority dated Mar. 14, 2017 for the corresponding international application No. PCT/JP2016/086565 (and English translation).
International preliminary report on patentability of the International Searching Authority dated Oct. 11, 2018 for the corresponding International application No. PCT/JP2016/086565 (English translation attached).

* cited by examiner

*Primary Examiner* — Christopher M Rodd
(74) *Attorney, Agent, or Firm* — Posz Law Group, PLC

(57) ABSTRACT

A rubber includes 5 parts by mass to 45 parts by mass of an uncross-linked EPM relative to 100 parts by mass of a cross-linked rubber polymer (other than EPM), and an oil in an amount equal to or more than the amount of the EPM. The rubber is foamed and has a specific gravity of more than 0.3 and 0.8 or less. A weather strip 1 and a hose 2 are formed of the rubber.

7 Claims, 1 Drawing Sheet

RUBBER, SEAL COMPONENT, AND HOSE

CROSS REFERENCE TO RELATED APPLICATIONS

This application is a U.S. national stage application of PCT/JP2016/086565 filed on Dec. 8, 2016, which claims priority to Japanese Patent Application No. 2016-065454 filed on Mar. 29, 2016, the contents of which are incorporated herein by reference.

TECHNICAL FIELD

The present invention relates to a rubber, and a seal component and a hose that are formed by using the same.

BACKGROUND ART

As a method for enhancing the sound insulation of a seal component formed of a rubber in vehicles, buildings, and the like, the following method is known.

A method for increasing the specific gravity of rubber in accordance with a rule involved in specific gravity (the higher specific gravity provides better sound insulation) includes a method for decreasing the foaming ratio of foamed rubber as described in Patent Document 1. In addition, a method for increasing the use amount of additive having high specific gravity is also conceivable. However, in this method, the weight of rubber product is increased. In particular, in the case of a seal component of vehicles, the increased weight conflicts with a reduction in weight that has been recently required, and becomes a problem.

A method for controlling the form of the foam (closed cell, open cell, etc.) of rubber described in Patent Document 2 is known. In the method, two kinds of foaming agents having different particle diameters are used to form cells having a larger diameter and cells having a smaller diameter in a foamed rubber. This prevents formation of open cells in which cells are in communication with each other, and allows the cells to exist as independent cells. Thus, sound insulation is enhanced. However, in this method, it is difficult to set an optimum foaming condition, and the physical properties may be deteriorated depending on settings.

In addition to the methods described above, a method described in Patent Document 3 associated with the application by the present applicant is known. In this method, a low-viscosity low molecular weight hydrocarbon-based oil that is usually added, and a high-viscosity high molecular weight hydrocarbon-based oil that is not usually added are added to a rubber. By the action of the latter oil, sound insulation is enhanced. This method does not have the problem described above. However, this method still has problems such as poor material handleability and longer weighing time since the viscosity of the high molecular weight oil is high.

Patent Document 4 discloses an invention relating to a vulcanized foam of a rubber component including a mixture of EPDM and 10 to 50% by weight of EPM.

Patent Document 4 describes that "as a vulcanizing agent, one or two or more kinds of vulcanizing agents that can vulcanize or cross-link EPDM and an ethylene-propylene rubber are appropriately used" (paragraph [0012]). An organic peroxide that cross-links EPM is used in Example 1 (paragraph [0029]). As is clear from this, the invention is different from the present invention in terms of cross-linking of not only EPDM but also EPM. Further, a reason for mixing of EPM in EPDM is that the content of diene in the whole rubber component is decreased to express heat resistance and the like. In Patent Document 4, sound insulation is not described.

Patent Document 5 describes a rubber foam that is obtained by foaming and cross-linking a rubber composition containing an ethylene-α-olefin-non-conjugated diene copolymer rubber, an ethylene-α-olefin copolymer rubber, a foaming agent, and sulfur as a cross-linker, and has a density of 0.3 g/cm$^3$ or less, and a sealing material. The ethylene-α-olefin-non-conjugated diene copolymer rubber is cross-linked, but the ethylene-α-olefin copolymer rubber is not cross-linked. However, since the density of the rubber foam is low, the sound insulation of a seal component is not favorable.

PRIOR ART DOCUMENTS

Patent Documents

Patent Document 1: Japanese Patent Application Publication No. 2011-11602
Patent Document 2: Japanese Patent Application Publication No. 2013-136661
Patent Document 3: Japanese Patent Application Publication No. 2015-189865
Patent Document 4: Japanese Patent No. 4554059
Patent Document 5: Japanese Patent Application Publication No. 2001-192488

SUMMARY OF THE INVENTION

Problem to be Solved by the Invention

It is an object of the present invention to provide a rubber in which favorable sound insulation can be obtained by a novel idea without increasing the specific gravity of the rubber, controlling the form of the foam, deteriorating the physical properties or increasing the weight, or deteriorating the handleability of materials described later, and to provide a seal component and a hose.

It is a further object of the present invention to prevent a surface of a rubber from whitening.

Means for Solving the Problem

To a rubber material, oil is added for increase in volume, plasticization, softening (improvement in processability), and the like. For example, a rubber material maker mainly sells a rubber called extended rubber or oil-extended rubber in which an extender oil is added to a rubber material for increase in volume or plasticization. Further, by a rubber processing maker, mainly a process oil is added for softening (improvement in processability) to a rubber material, followed by kneading and processing.

Oils such as the extender oil and the process oil include a paraffinic oil, a naphthene-based oil, an aromatic oil, and a blend thereof. In view of processability, an oil having a low weight average molecular weight of about 500 to 1,000 is used for the oils. As the molecular weight of oil is lower, the viscosity is decreased, and as the molecular weight of oil is higher, the viscosity is increased.

Some of the present inventors focused on the oil and investigated, completed the invention of rubber material in which a low molecular weight hydrocarbon-based oil having a weight average molecular weight of 1,500 or less and a higher molecular weight hydrocarbon-based oil having a weight average molecular weight of 5,000 or more are mixed in a rubber polymer, and filed a patent application (Patent Document 3 described above). Addition of the high molecular weight oil increases the number (density) of entanglements between oil molecules or between oil molecules and rubber polymer molecules. As the number of entanglements is larger, friction generated during transmission of vibration of sound is increased, and a capability of converting the sound into heat is considered to be enhanced. Therefore, favorable sound insulation is obtained.

Since the higher molecular weight hydrocarbon-based oil of the invention described above is a liquid having high viscosity, there is a problem in which weighing takes time. The present inventors have continued the investigation, and intensively investigated. The present inventors have found that when an uncross-linked ethylene-propylene rubber (EPM) is used, favorable sound insulation is obtained. Thus, the present invention has been completed.

The present inventors further have found that in the present invention, a surface of a rubber also whitens in a high temperature and high humidity test in a closed system depending on mixing, and the whitening occurs when the amount of stearic acid mixed is large. The present inventors have confirmed that when the amount of stearic acid mixed is small, the sound insulation of the rubber is not easily improved, and the kneading property and processability of the rubber in the state of a material are decreased.

A rubber of the present invention includes 5 parts by mass to 45 parts by mass of an uncross-linked EPM relative to 100 parts by mass of a cross-linked rubber polymer (other than EPM), and an oil in an amount equal to or more than the amount of the EPM. The rubber is foamed and has a specific gravity of more than 0.3 and 0.8 or less. The lower limit of the specific gravity is preferably 0.4 or more. The upper limit of the specific gravity is preferably 0.7 or less.

The oil is preferably a hydrocarbon-based oil having a weight average molecular weight of 1,500 or less.

The mass ratio of the oil to the EPM is preferably 1 to 10.

It is preferable that the rubber further contain stearic acid in an amount of 0.5 parts by mass to 8 parts by mass relative to 100 parts by mass of the rubber polymer. It is more preferable that the following (a) or (b) be satisfied.

(a) The rubber further contains stearic acid in an amount of 2 parts by mass to 5 parts by mass relative to 100 parts by mass of the rubber polymer.

(b) The rubber further contains stearic acid in an amount of 0.5 parts by mass to 5 parts by mass, and a fatty acid ester-based processing aid in an amount of 0.5 parts by mass to 20 parts by mass relative to 100 parts by mass of the rubber polymer.

A seal component of the present invention is formed of the rubber.

A hose of the present invention is formed of the rubber.

An action of the present invention will be described.

(1) Since the rubber contains an uncross-linked EPM, the sound insulation degree (dBA) of sound of 400 Hz to 10,000 Hz is increased, that is, the sound insulation is enhanced. Although a mechanism of this phenomenon is not clear, the mechanism is considered as follows. Since the uncross-linked EPM is contained, the number (density) of entanglements between EPM molecules or between EPM molecules and rubber polymer molecules is increased. As the number of entanglements is larger, friction generated during transmission of vibration of sound is increased, and a capability of converting the sound into heat (absorbing the sound) is enhanced.

(2) Since stearic acid is contained in an amount of 0.5 parts by mass or more, the sound insulation is further improved. A mechanism of the phenomenon is not clear currently.

As the amount of stearic acid is large, bloom is likely to be caused. In view of this, the upper limit of amount of stearic acid is preferably 8 parts by mass. As being clear from further investigation, when the amount of stearic acid is more than 5 parts by mass, bloom is caused so that whitening is caused. Therefore, when the upper limit of amount of stearic acid is 5 parts by mass, whitening is not caused.

When stearic acid is contained in an amount of less than 2 parts by mass, the sound insulation is improved, but the viscosity in the state of a material is high, and the kneading property and the processability are insufficient. This is clear from the further investigation. In this case, when a fatty acid ester-based processing aid is further contained in an amount of 0.5 to 20 parts by mass, the viscosity is decreased and the kneading property and the processability are improved without deteriorating the sound insulation. An action of the fatty acid ester-based processing aid is the same as that in the case where 2 to 5 parts by mass of stearic acid is contained.

(3) Since the rubber is foamed and has a specific gravity of more than 0.3 (preferably 0.4 or more), the level of sound insulation is equal to or higher than a constant level. Therefore, the action of improving the sound insulation of (1) and (2) markedly appears. When the specific gravity is 0.3 or less, the level of sound insulation is originally low, and the same action does not appear.

Since the rubber is foamed and has a specific gravity of 0.8 or less (preferably 0.7 or less), the weight of a rubber product is reduced. This allows a reduction in weight that has been recently required, particularly in the case of a seal component of vehicles. When the specific gravity is more than 0.8, the weight of the rubber product is increased.

(4) Since EPM is a solid, EPM can be handled by the same method as that for another solid material.

(5) When all oils in the rubber are changed to EPM, the rubber is not wound around a roll during rolling and kneading, and the processability is deteriorated. Therefore, EPM is mixed while oil in an amount equal to or more than the amount of EPM is present in the rubber, so that the rolling and kneading properties can be secured and the sound insulation can be enhanced.

Effects of the Invention

With the rubber, the seal component, and the hose according to the present invention, favorable sound insulation can be obtained without deteriorating the physical properties, increasing the weight, or deteriorating the handleability and roll processability of materials. Further, it is possible to avoid whitening.

MODES FOR CARRYING OUT THE INVENTION

1. Cross-Linked Rubber Polymer

Figure 1A:
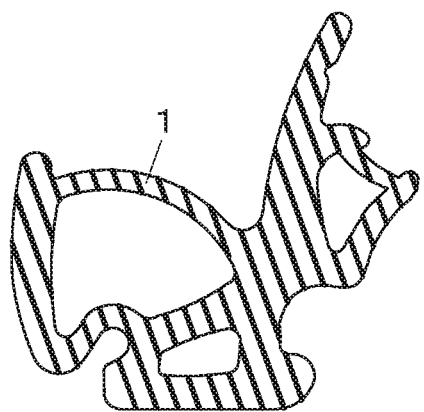
FIG. 1A is a cross-sectional view of a weather strip for automobiles.

Examples of the cross-linked rubber polymer (other than EPM) include, but not particularly limited to, an ethylene-propylene-non-conjugated diene rubber (EPDM), an isobutylene-isoprene rubber (IIR), an isoprene rubber (IR), a natural rubber (NR), a butadiene rubber (BR), and a styrene-butadiene rubber (SBR).

In the case of EPDM, the ethylene content is not particularly limited, and is preferably 60% by mass or less. When the ethylene content is high, the low-temperature characteristics of vulcanized rubber may be deteriorated.

Examples of non-conjugated diene in EPDM include, but not particularly limited to, 5-ethylidene-2-norbornene (ENB), dicyclopentadiene (DCPD), and 1,4-hexadiene (1,4-HD).

As EPDM, a non-oil-extended EPDM or an oil-extended EPDM can be used. An oil component contained in the oil-extended EPDM is included in "oil" in the present invention.

2. Uncross-Linked EPM

The amount of uncross-linked EPM is not particularly limited, and is preferably 5 parts by mass to 45 parts by mass, and more preferably 10 parts by mass to 30 parts by mass, relative to 100 parts by mass of the rubber polymer. When the amount of uncross-linked EPM is less than 5 parts by mass, the effect of enhancing the sound insulation is decreased. When it is more than 45 parts by mass, the viscosity of the material is increased.

The ethylene content of EPM is not particularly limited, and is preferably 60% by mass or less. When the ethylene content is high, the low-temperature characteristics are deteriorated.

As EPM, a non-oil-extended EPM or an oil-extended EPM can be used. An oil component contained in the oil-extended EPM is included in "oil" in the present invention.

In the case where the rubber of the present invention contains the cross-linked rubber polymer and the uncross-linked EPM, a vulcanizing agent that vulcanizes the rubber polymer and does not cross-link EPM (e.g., sulfur) is used, and a vulcanizing agent that cross-links EPM (e.g., organic peroxide) is not be used.

3. Oil

The amount of oil is not particularly limited, and is preferably an amount equal to or more than the amount in parts by mass of EPM. This is because the rubber is wound around a roll during rolling and kneading and the processability is favorable.

The mass ratio of oil to EPM is not particularly limited, and is preferably 1 to 10, and more preferably 2 to 8. When the mass ratio is less than 1, the processability is deteriorated.

When the mass ratio is more than 10, plasticization is excessively promoted, and the processability is deteriorated.

Examples of the oil include, but not particularly limited to, a paraffinic oil, a naphthene-based oil, an aromatic oil, and a hydrocarbon-based oil obtained by blending them. The weight average molecular weight of the hydrocarbon-based oil is preferably 1,500 or less in terms of low viscosity and favorable processability. The lower limit of the weight average molecular weight is not particularly limited, and is preferably 100 in terms of availability. Most of oil that is conventionally added to a rubber, such as an extender oil and a process oil, can be used as a preferable hydrocarbon-based oil having the weight average molecular weight of 100 to 1,500.

4. Stearic Acid

In an aspect of (a), the stearic acid is contained in an amount of 0.5 parts by mass to 5 parts by mass, and preferably 1 to 5 parts by mass, relative to 100 parts by mass of the rubber polymer. When the amount of the stearic acid is 1 part by mass or more, the sound insulation is further enhanced and the viscosity in the state of a material is further decreased.

5. Fatty Acid Ester-Based Processing Aid

In the aspect of (a), the fatty acid ester-based processing aid may or may not be contained.

In an aspect of (b), the fatty acid ester-based processing aid is contained in an amount of 0.5 parts by mass to 20 parts by mass, and preferably 1 part by mass to 10 parts by mass, relative to 100 parts by mass of the rubber polymer. When the amount of the fatty acid ester-based processing aid is 1 part by mass or more, the viscosity in the state of a material is further decreased. The upper limit of the fatty acid ester-based processing aid is not particularly limited. When the upper limit thereof is more than 20 parts by mass, the proportions of other components are relatively decreased, and the physical properties may be affected. Therefore, an upper limit of about 10 parts by mass is appropriate.

6. Other Compounding Materials

In the rubber, other compounding materials may be mixed. Examples of the other compounding materials include, but not particularly limited to, carbon black, calcium carbonate, zinc oxide, an age resistor, a colorant, a foaming agent, and a vulcanization accelerator.

7. Molded Product Formed of Rubber

The molded product formed of the rubber of the present invention is not particularly limited. In terms of utilizing its high sound insulation, the molded product is a seal component. Examples of the seal component include sealing materials of weather strips, door glass runs, window frames, and gaskets of engines for vehicles such as an automobile, a railway vehicle, a ship, and an air craft, sealing materials for foods, sealing materials for interior and exterior components, and sealing materials for electrical components. Further, examples thereof include seal components of window frames of buildings. In addition to the seal component, examples of the molded product include hoses including a hose for automobiles. Leakage of flow sound of a flow substance in the hose to the exterior can be suppressed.

EXAMPLES

Rubber materials for each rubber in Examples 1 to 44 and Comparative Examples 1 to 5 at a combination (the value is in parts by mass) shown in Tables 1 to 4 described below were prepared. A foamed rubber sheet was molded from each of the rubbers.

TABLE 1

| | Sample name | Example 1 | Example 2 | Example 3 | Example 4 | Example 5 |
|---|---|---|---|---|---|---|
| EPDM | Oil-extended EPDM (oil-extended amount of extender oil: 20 phr) | 120 (Polymer 100) (Oil 20) | 120 (Polymer 100) (Oil 20) | 120 (Polymer 100) (Oil 20) | 120 (Polymer 100) (Oil 20) | 120 (Polymer 100) (Oil 20) |
| Oil | Process oil | 60 | 55 | 50 | 40 | 30 |
| EPM | EPM (1) | 10 | 15 | 20 | 30 | 40 |
| | EPM (2) | — | — | — | — | — |
| Compounding material | Carbon black | 120 | 120 | 120 | 120 | 120 |
| | Calcium carbonate | 50 | 50 | 50 | 50 | 50 |
| | Zinc oxide | 7 | 7 | 7 | 7 | 7 |
| | Stearic acid | 1 | 1 | 1 | 1 | 1 |
| | Other | 5 | 5 | 5 | 5 | 5 |
| Vulcanizing agent | Sulfur powder | 1.2 | 1.2 | 1.2 | 1.2 | 1.2 |
| Sulfur compound | Organic vulcanizing agent (morpholine-based) | 0.6 | 0.6 | 0.6 | 0.6 | 0.6 |
| | Thiazole-based | 2 | 2 | 2 | 2 | 2 |
| | Dithiocarbamate-based | 1.4 | 1.4 | 1.4 | 1.4 | 1.4 |
| | Sulfenamide-based | 0.3 | 0.3 | 0.3 | 0.3 | 0.3 |
| Foaming agent | OBSH foaming agent | 3.04 | 3.04 | 3.04 | 3.04 | 3.04 |
| | Mass ratio Oil/EPM | 8.0 | 5.0 | 3.5 | 2.0 | 1.3 |
| | Roll processability | ○ | ○ | ○ | ○ | ○ |
| Physical property | Sound insulation degree (dBA) of 0.4 to 10 kHz | 42.9 | 43.2 | 43.3 | 43.2 | 42.6 |
| | Specific gravity | about 0.7 | about 0.7 | about 0.7 | about 0.7 | about 0.7 |

| | Sample name | Example 6 | Example 7 | Example 8 | Example 9 | Example 10 |
|---|---|---|---|---|---|---|
| EPDM | Oil-extended EPDM (oil-extended amount of extender oil: 20 phr) | 120 (Polymer 100) (Oil 20) | 120 (Polymer 100) (Oil 20) | 120 (Polymer 100) (Oil 20) | 120 (Polymer 100) (Oil 20) | 120 (Polymer 100) (Oil 20) |
| Oil | Process oil | 50 | 50 | 50 | 50 | 50 |
| EPM | EPM (1) | — | 15 | 15 | 15 | 15 |
| | EPM (2) | 20 | — | — | — | — |
| Compounding material | Carbon black | 120 | 120 | 120 | 120 | 120 |
| | Calcium carbonate | 50 | 50 | 50 | 50 | 50 |
| | Zinc oxide | 7 | 7 | 7 | 7 | 7 |
| | Stearic acid | 1 | 0.5 | 2 | 3 | 5 |
| | Other | 5 | 5 | 5 | 5 | 5 |
| Vulcanizing agent | Sulfur powder | 1.2 | 1.2 | 1.2 | 1.2 | 1.2 |
| Sulfur compound | Organic vulcanizing agent (morpholine-based) | 0.6 | 0.6 | 0.6 | 0.6 | 0.6 |
| | Thiazole-based | 2 | 2 | 2 | 2 | 2 |
| | Dithiocarbamate-based | 1.4 | 1.4 | 1.4 | 1.4 | 1.4 |
| | Sulfenamide-based | 0.3 | 0.3 | 0.3 | 0.3 | 0.3 |
| Foaming agent | OBSH foaming agent | 3.04 | 3.04 | 3.04 | 3.04 | 3.04 |
| | Mass ratio Oil/EPM | 3.5 | 4.7 | 4.7 | 4.7 | 4.7 |
| | Roll processability | ○ | ○ | ○ | ○ | ○ |
| Physical property | Sound insulation degree (dBA) of 0.4 to 10 kHz | 43.8 | 43.4 | 44.1 | 43.5 | 44.0 |
| | Specific gravity | about 0.7 | about 0.7 | about 0.7 | about 0.7 | about 0.7 |

| | Sample name | Example 11 | Comparative Example 1 | Comparative Example 2 | Comparative Example 3 |
|---|---|---|---|---|---|
| EPDM | Oil-extended EPDM (oil-extended amount of extender oil: 20 phr) | 120 (Polymer 100) (Oil 20) | 120 (Polymer 100) (Oil 20) | 120 (Polymer 100) (Oil 20) | 120 (Polymer 100) (Oil 20) |
| Oil | Process oil | 50 | 70 | 0 | 20 |
| EPM | EPM (1) | 15 | — | 70 | 50 |
| | EPM (2) | — | — | — | — |
| Compounding material | Carbon black | 120 | 120 | 120 | 120 |
| | Calcium carbonate | 50 | 50 | 50 | 50 |
| | Zinc oxide | 7 | 7 | 7 | 7 |
| | Stearic acid | 7 | 1 | 1 | 1 |
| | Other | 5 | 5 | 5 | 5 |
| Vulcanizing agent | Sulfur powder | 1.2 | 1.2 | 1.2 | 1.2 |
| Sulfur compound | Organic vulcanizing agent (morpholine-based) | 0.6 | 0.6 | 0.6 | 0.6 |
| | Thiazole-based | 2 | 2 | 2 | 2 |
| | Dithiocarbamate-based | 1.4 | 1.4 | 1.4 | 1.4 |
| | Sulfenamide-based | 0.3 | 0.3 | 0.3 | 0.3 |
| Foaming agent | OBSH foaming agent | 3.04 | 3.04 | 3.04 | 3.04 |
| | Mass ratio Oil/EPM | 4.7 | only Oil | 0.3 | 0.8 |
| | Roll processability | ○ | ○ | X | Δ |

TABLE 1-continued

| Physical property | Sound insulation degree (dBA) of 0.4 to 10 kHz | 43.1 | 41.5 | — | 42.6 |
|---|---|---|---|---|---|
| | Specific gravity | about 0.7 | about 0.7 | about 0.7 | about 0.7 |

TABLE 2

| | Example No. | 12 | 13 | 14 | 15 | 16 | 17 | 18 | 19 |
|---|---|---|---|---|---|---|---|---|---|
| EPDM | Oil-extended EPDM (oil-extended amount of extender oil: 20 phr) | 120 (Polymer 100) (Oil 20) | ← | ← | ← | ← | ← | ← | ← |
| Oil | Process oil | 55 | ← | ← | ← | ← | ← | ← | ← |
| EPM | EPM (1) | 15 | ← | ← | ← | ← | ← | ← | ← |
| Compounding material | Carbon black | 120 | ← | ← | ← | ← | ← | ← | ← |
| | Calcium carbonate | 50 | ← | ← | ← | ← | ← | ← | ← |
| | Zinc oxide | 7 | ← | ← | ← | ← | ← | ← | ← |
| | Stearic acid | 1 | 1 | 1 | 1 | 2 | 2 | 2 | 2 |
| | Fatty acid ester-based processing aid | 1 | 2 | 3 | 5 | 0 | 1 | 2 | 3 |
| | Other | 4 | ← | ← | ← | ← | ← | ← | ← |
| Vulcanizing agent | Sulfur powder | 1.2 | ← | ← | ← | ← | ← | ← | ← |
| Sulfur compound | Organic vulcanizing agent (morpholine-based) | 0.6 | ← | ← | ← | ← | ← | ← | ← |
| | Thiazole-based | 2 | ← | ← | ← | ← | ← | ← | ← |
| | Dithiocarbamate-based | 1.4 | ← | ← | ← | ← | ← | ← | ← |
| | Sulfenamide-based | 0.3 | ← | ← | ← | ← | ← | ← | ← |
| Foaming agent | OBSH foaming agent | 3.04 | ← | ← | ← | ← | ← | ← | ← |
| | Mass ratio Oil/EPM | 5.0 | ← | ← | ← | ← | ← | ← | ← |
| Physical property | Sound insulation degree (dBA) of 0.4 to 10 kHz | 42.7 | 43.0 | 43.4 | 43.5 | 42.9 | 43.0 | 43.6 | 43.3 |
| | Mooney viscosity (M1 + 4, 100° C.) | 60 | 59 | 57 | 56 | 60 | 58 | 56 | 55 |
| | Whitening test | ○ | ○ | ○ | ○ | ○ | ○ | ○ | ○ |
| | Specific gravity | 0.7 | 0.7 | 0.7 | 0.7 | 0.7 | 0.7 | 0.7 | 0.7 |

| | Example No. | 20 | 21 | 22 | 23 | 24 | 25 | 26 | 27 |
|---|---|---|---|---|---|---|---|---|---|
| EPDM | Oil-extended EPDM (oil-extended amount of extender oil: 20 phr) | 120 (Polymer 100) (Oil 20) | ← | ← | ← | ← | ← | ← | ← |
| Oil | Process oil | 55 | ← | ← | ← | ← | ← | ← | ← |
| EPM | EPM (1) | 15 | ← | ← | ← | ← | ← | ← | ← |
| Compounding material | Carbon black | 120 | ← | ← | ← | ← | ← | ← | ← |
| | Calcium carbonate | 50 | ← | ← | ← | ← | ← | ← | ← |
| | Zinc oxide | 7 | ← | ← | ← | ← | ← | ← | ← |
| | Stearic acid | 2 | 3 | 3 | 3 | 3 | 3 | 5 | 5 |
| | Fatty acid ester-based processing aid | 5 | 0 | 1 | 2 | 3 | 5 | 0 | 1 |
| | Other | 4 | ← | ← | ← | ← | ← | ← | ← |
| Vulcanizing agent | Sulfur powder | 1.2 | ← | ← | ← | ← | ← | ← | ← |
| Sulfur compound | Organic vulcanizing agent (morpholine-based) | 0.6 | ← | ← | ← | ← | ← | ← | ← |
| | Thiazole-based | 2 | ← | ← | ← | ← | ← | ← | ← |
| | Dithiocarbamate-based | 1.4 | ← | ← | ← | ← | ← | ← | ← |
| | Sulfenamide-based | 0.3 | ← | ← | ← | ← | ← | ← | ← |
| Foaming agent | OBSH foaming agent | 3.04 | ← | ← | ← | ← | ← | ← | ← |
| | Mass ratio Oil/EPM | 5.0 | ← | ← | ← | ← | ← | ← | ← |
| Physical property | Sound insulation degree (dBA) of 0.4 to 10 kHz | 42.8 | 43.5 | 43.5 | 43.7 | 43.5 | 43.6 | 43.8 | 43.9 |
| | Mooney viscosity (M1 + 4, 100° C.) | 55 | 56 | 54 | 54 | 54 | 53 | 55 | 55 |
| | Whitening test | ○ | ○ | ○ | ○ | ○ | ○ | ○ | ○ |
| | Specific gravity | 0.7 | 0.7 | 0.7 | 0.7 | 0.7 | 0.7 | 0.7 | 0.7 |

| | Example No. | 28 | 29 | 30 |
|---|---|---|---|---|
| EPDM | Oil-extended EPDM (oil-extended amount of extender oil: 20 phr) | 120 (Polymer 100) (Oil 20) | ← | ← |
| Oil | Process oil | 55 | ← | ← |
| EPM | EPM (1) | 15 | ← | ← |
| Compounding material | Carbon black | 120 | ← | ← |
| | Calcium carbonate | 50 | ← | ← |
| | Zinc oxide | 7 | ← | ← |
| | Stearic acid | 5 | 5 | 5 |

TABLE 2-continued

|  |  |  |  |  |
|---|---|---|---|---|
|  | Fatty acid ester-based processing aid | 2 | 3 | 5 |
|  | Other | 4 | ← | ← |
| Vulcanizing agent | Sulfur powder | 1.2 | ← | ← |
| Sulfur compound | Organic vulcanizing agent (morpholine-based) | 0.6 | ← | ← |
|  | Thiazole-based | 2 | ← | ← |
|  | Dithiocarbamate-based | 1.4 | ← | ← |
|  | Sulfenamide-based | 0.3 | ← | ← |
| Foaming agent | OBSH foaming agent | 3.04 | ← | ← |
|  | Mass ratio Oil/EPM | 5.0 | ← | ← |
| Physical property | Sound insulation degree (dBA) of 0.4 to 10 kHz | 43.7 | 43.7 | 44.1 |
|  | Mooney viscosity (M1 + 4, 100° C.) | 53 | 52 | 52 |
|  | Whitening test | ○ | ○ | ○ |
|  | Specific gravity | 0.7 | 0.7 | 0.7 |

TABLE 3

|  | Example No. | 31 | 32 | 33 | 34 | 35 | 36 | 37 | 38 |
|---|---|---|---|---|---|---|---|---|---|
| EPDM | Oil-extended EPDM (oil-extended amount of extender oil: 20 phr) | 120 (Polymer 100) (Oil 20) | ← | ← | ← | ← | ← | ← | ← |
| Oil | Process oil | 55 | ← | ← | ← | ← | ← | ← | ← |
| EPM | EPM (1) | 15 | ← | ← | ← | ← | ← | ← | ← |
| Compounding material | Carbon black | 120 | ← | ← | ← | ← | ← | ← | ← |
|  | Calcium carbonate | 50 | ← | ← | ← | ← | ← | ← | ← |
|  | Zinc oxide | 7 | ← | ← | ← | ← | ← | ← | ← |
|  | Stearic acid | 0 | 0 | 0 | 0 | 0 | 1 | 7 | 7 |
|  | Fatty acid ester-based processing aid | 0 | 1 | 2 | 3 | 5 | 0 | 0 | 1 |
|  | Other | 4 | ← | ← | ← | ← | ← | ← | ← |
| Vulcanizing agent | Sulfur powder | 1.2 | ← | ← | ← | ← | ← | ← | ← |
| Sulfur compound | Organic vulcanizing agent (morpholine-based) | 0.6 | ← | ← | ← | ← | ← | ← | ← |
|  | Thiazole-based | 2 | ← | ← | ← | ← | ← | ← | ← |
|  | Dithiocarbamate-based | 1.4 | ← | ← | ← | ← | ← | ← | ← |
|  | Sulfenamide-based | 0.3 | ← | ← | ← | ← | ← | ← | ← |
| Foaming agent | OBSH foaming agent | 3.04 | ← | ← | ← | ← | ← | ← | ← |
|  | Mass ratio Oil/EPM | 5.0 | ← | ← | ← | ← | ← | ← | ← |
| Physical property | Sound insulation degree (dBA) of 0.4 to 10 kHz | 40.3 | 41.5 | 41.2 | 41.5 | 41.9 | 42.3 | 43.5 | 43.7 |
|  | Mooney viscosity (M1 + 4, 100° C.) | 67 | 67 | 64 | 62 | 61 | 61 | 53 | 53 |
|  | Whitening test | ○ | ○ | ○ | ○ | ○ | ○ | X | X |
|  | Specific gravity | 0.7 | 0.7 | 0.7 | 0.7 | 0.7 | 0.7 | 0.7 | 0.7 |
|  | Example No. | 39 | 40 | 41 |  |  |  |  |  |
| EPDM | Oil-extended EPDM (oil-extended amount of extender oil: 20 phr) | 120 (Polymer 100) (Oil 20) | ← | ← |  |  |  |  |  |
| Oil | Process oil | 55 | ← | ← |  |  |  |  |  |
| EPM | EPM (1) | 15 | ← | ← |  |  |  |  |  |
| Compounding material | Carbon black | 120 | ← | ← |  |  |  |  |  |
|  | Calcium carbonate | 50 | ← | ← |  |  |  |  |  |
|  | Zinc oxide | 7 | ← | ← |  |  |  |  |  |
|  | Stearic acid | 7 | 7 | 7 |  |  |  |  |  |
|  | Fatty acid ester-based processing aid | 2 | 3 | 5 |  |  |  |  |  |
|  | Other | 4 | ← | ← |  |  |  |  |  |
| Vulcanizing agent | Sulfur powder | 1.2 | ← | ← |  |  |  |  |  |
| Sulfur compound | Organic vulcanizing agent (morpholine-based) | 0.6 | ← | ← |  |  |  |  |  |
|  | Thiazole-based | 2 | ← | ← |  |  |  |  |  |
|  | Dithiocarbamate-based | 1.4 | ← | ← |  |  |  |  |  |
|  | Sulfenamide-based | 0.3 | ← | ← |  |  |  |  |  |

TABLE 3-continued

| | | | | |
|---|---|---|---|---|
| Foaming agent | OBSH foaming agent | 3.04 | ← | ← |
| | Mass ratio Oil/EPM | 5.0 | ← | ← |
| Physical property | Sound insulation degree (dBA) of 0.4 to 10 kHz | 43.7 | 43.5 | 43.5 |
| | Mooney viscosity (M1 + 4, 100° C.) | 53 | 52 | 52 |
| | Whitening test | X | X | X |
| | Specific gravity | 0.7 | 0.7 | 0.7 |

Vulcanizing agent: Sulfur powder

TABLE 4

| | Sample name | Comparative Example 4 | Example 42 | Example 43 | Comparative Example 5 | Example 44 |
|---|---|---|---|---|---|---|
| EPDM | Oil-extended EPDM (oil-extended amount of extender oil: 20 phr) | 120 (Polymer 100) (Oil 20) | ← | ← | ← | ← |
| Oil | Process oil | 42 | 27 | 27 | 55 | 40 |
| EPM | EPM (1) | 0 | 15 | 15 | 0 | 15 |
| Compounding material | Carbon black | 102 | 102 | 102 | 84 | 84 |
| | Calcium carbonate | 22 | 22 | 22 | 75 | 75 |
| | Zinc oxide | 7 | 7 | 7 | 10 | 10 |
| | Stearic acid | 2 | 2 | 4 | 5 | 5 |
| | Fatty acid ester-based processing aid | 1 | 1 | 1 | 1 | 1 |
| | Other | 2 | 2 | 2 | 5 | 5 |
| Vulcanizing agent | Sulfur powder | 1.2 | 1.2 | 1.2 | 1.2 | 1.2 |
| Sulfur compound | Organic vulcanizing agent (morpholine-based) | 0.6 | 0.6 | 0.6 | 0.6 | 0.6 |
| | Thiazole-based | 2 | 2 | 2 | 2 | 2 |
| | Dithiocarbamate-based | 1.4 | 1.4 | 1.4 | 1.4 | 1.4 |
| | Sulfenamide-based | 0.3 | 0.3 | 0.3 | 0.3 | 0.3 |
| Foaming agent | OBSH foaming agent | 5.85 | 5.85 | 5.85 | 5.85 | 5.85 |
| | Mass ratio Oil/EPM | only Oil | 3.1 | 3.1 | only Oil | 4.0 |
| Physical property | Sound insulation degree (dBA) of 0.4 to 10 kHz | 38.2 | 38.9 | 39.6 | 40.5 | 41.1 |
| | Mooney viscosity (M1 + 4, 100° C.) | 42.7 | 57.9 | 53 | 39.2 | 51.1 |
| | Whitening test | ○ | ○ | ○ | ○ | ○ |
| | Specific gravity | 0.4 | 0.4 | 0.4 | 0.5 | 0.5 |

Details of the components used herein are as follows.

Oil-extended EPDM: trade name "Mitsui EPT8120E" available from Mitsui Chemicals, Inc. (diene type: ENB, diene content (ratio): 14% by mass, oil-extended amount: 20 phr)

120 parts by mass of mixed oil-extended EPDM includes 100 parts by mass of EPDM polymer and 20 parts by mass of extender oil. The weight average molecular weight of the extender oil is not disclosed, but is estimated to be 1,500 or less.

EPM (1): trade name "Mitsui EPT0045" available from Mitsui Chemicals, Inc. (ethylene content (ratio): 51% by mass)

EPM (2): trade name "Vistalon 404" available from Exxon Mobil Corporation (ethylene content: 45% by mass)

Process oil: trade name "Diana process oil PS-380" available from Idemitsu Kosan Co., Ltd. (paraffinic mineral oil, molecular weight: 700, kinematic viscosity (100° C.): 30 mm²/s)

Carbon black: SRF, iodine absorption: 20 mg/g, DBP absorption: 115 cm³/100 g

Stearic acid: trade name "LUNAC S-50V" available from Kao Corporation

Fatty acid ester-based processing aid: trade name "Emaster 430W" available from Riken Vitamin Co., Ltd.

Zinc oxide: trade name "META Z-102" available from Inoue Calcium Corporation

Organic vulcanizing agent: trade name "VULNOC R" (4,4'-dithiodimorpholine) available from Ouchi Shinko Chemical Industrial Co., Ltd.

Foaming agent: p,p'-oxybisbenzenesulfonyl hydrazide (OBSH) foaming agent

The mass ratio oil/EPM is a mass ratio of oil (sum of process oil and extender oil in oil-extended EPDM) to EPM.

The components of the rubber materials in Examples and Comparative Examples were each weighed so as to satisfy each mixing ratio in Tables 1 to 4. The components were kneaded by a Banbury mixer and a roller, extruded by an extruder, and then heated, resulting in vulcanization and foaming. The resultant was molded and processed into a foamed rubber sheet having a thickness of 1.2 mm. Since sulfur in the vulcanizing agent cross-links EPDM but does not cross-link EPM, the foamed rubber sheets in Examples and Comparative Examples contain cross-linked EPDM and uncross-linked EPM.

The rubber materials in Examples and Comparative Examples were subjected to the following evaluations.

1. Roll Processability (Only in Examples 1 to 11 and Comparative Examples 1 to 3)

When a rubber during roll processing was sufficiently wound around a roll and the processability (kneading property) was favorable, the roll processability was evaluated to be good (○). When the rubber slightly floated, the roll processability was evaluated to be fair (Δ). When the rubber severely floated and could not be processed, the roll processability was evaluated to be poor (×).

2. Processability (Mooney Viscosity)

For the rubber materials kneaded (before vulcanization), the Mooney viscosity (ML (1+4) 100° C.) was measured. As the Mooney viscosity is lower, the processability can be evaluated to be more excellent.

For the rubbers (foamed rubber sheets) obtained by molding the rubber materials in Examples and Comparative Examples, the following measurement and evaluation were performed.

3. Sound Insulation

The produced foamed rubber sheets were each mounted in a jig having an opening area of 10 mm×90 mm, and the sound insulation degree (dBA) of sound of 400 Hz to 10,000 Hz was measured in an atmosphere of 23° C. As the sound insulation degree is higher, the sound insulation can be evaluated to be more excellent.

The sound insulation degree to be required varies depending on the kind of rubber product, and the level of the sound insulation degree largely varies depending on the specific gravity of rubber. Therefore, the evaluation of sound insulation was performed by comparison of Examples and Comparative Examples of which the specific gravities were the same.

4. Whitening Test

For the produced foamed rubber sheets, a high temperature and high humidity test in a closed system was performed. A case where whitening due to bloom was not observed was evaluated to be good (○), and a case where whitening was observed was evaluated to be poor (×).

5. Specific Gravity

The specific gravity of each of the produced foamed rubber sheets was measured.

The foamed rubber sheets in Examples 1 to 41 and Comparative Examples 1 to 3 have substantially the same specific gravities of about 0.7 and their forms of the foam are also visually the same. The specific gravities of the foamed rubber sheets in Examples 42 and 43 and Comparative Example 4 were 0.4. The specific gravities of the foamed rubber sheets in Example 44 and Comparative Example 5 were 0.5.

In the foamed rubber sheets in Examples 1 to 11, the sound insulation was improved and the roll processability was good as compared with Comparative Example 1. In Comparative Example 2, roll processing was not performed, and the sound insulation was not examined. In Comparative Example 3, the sound insulation was improved as compared with Comparative Example 1, but the roll processability was insufficient.

In the foamed rubber sheets in Examples 12 to 30, the sound insulation was improved as compared with Comparative Example 1, the Mooney viscosity was sufficiently low, and whitening was not observed.

In the foamed rubber sheets in Examples 31 to 35, despite the fact that no stearic acid is contained, the sound insulation was substantially the same as that in Comparative Example 1. The foamed rubber sheets were evaluated to be good. A reason for slightly high Mooney viscosity is considered to be that the viscosity is not sufficiently decreased even by addition of a fatty acid ester-based processing aid due to the absence of stearic acid. Due to the absence of stearic acid, whitening was not observed.

In the foamed rubber sheet in Example 36, the sound insulation was higher than those in Comparative Example 1 and Example 31. This is considered due to a small amount of stearic acid. A reason for slightly high Mooney viscosity is considered to be that a fatty acid ester-based processing aid is not added and the viscosity is not sufficiently decreased by a small amount of stearic acid. Whitening was not observed.

In the foamed rubber sheets in Examples 37 to 41, the sound insulation was higher than those in Comparative Example 1 and Example 31, and the Mooney viscosity was sufficiently low. Whitening due to bloom of stearic acid was slightly observed.

In the foamed rubber sheets in Examples 42 and 43, the sound insulation was slightly improved as compared with Comparative Example 4. The Mooney viscosity was sufficiently low, and whitening was not observed.

In the foamed rubber sheet in Example 44, the sound insulation was slightly improved as compared with Comparative Example 5. The Mooney viscosity was sufficiently low, and whitening was not observed.

Figure 1B:
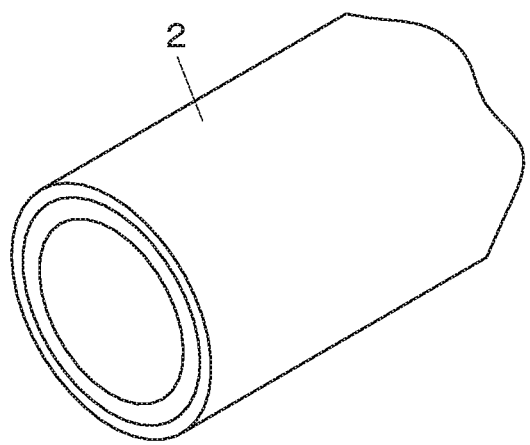
FIG. 1B is a cross-sectional view of a hose for automobiles, where the weather strip and the hose are both molded products formed of a rubber of Example.

FIG. 1A shows a weather strip 1 for automobiles (cross section), and FIG. 1B shows a hose 2 for feeding fuel, refrigerant, or air for automobiles, which are a molded product formed of the rubber in each of Examples 1 to 44. With the weather strip 1, the sound insulation of sound transmitted through the weather strip 1 is improved. With the hose 2, leakage of flow sound of the fuel, refrigerant, or air in the hose to the exterior can be reduced.

The present invention is not limited to Examples described above, and the present invention can be embodied by appropriate modifications without departing from the spirit of the present invention.

REFERENCE SIGNS LIST

1 Weather strip
2 Hose

The invention claimed is:

1. A foamed rubber consisting essentially of:
a rubber polymer in an amount of 105 parts by mass to 145 parts by mass, the rubber polymer consisting of a cross-linked EPDM rubber in an amount of 100 parts by mass and an uncross-linked EPM rubber that is a solid in an amount 5 parts by mass to 45 parts by mass, and
a hydrocarbon-based oil having a weight average molecular weight of 1,500 or less in an amount equal to or more than the amount of the EPM, and
wherein the foamed rubber was obtained by vulcanizing a mixture of the rubber polymer and the hydrocarbon-based oil using a vulcanizing agent that vulcanized the EPDM rubber and did not cross-link the uncross-linked EPM rubber, and
the foamed rubber material has a specific gravity of more than 0.3 and 0.8 or less.

2. The foamed rubber according to claim 1, wherein a mass ratio of the hydrocarbon-based oil to the EPM is 1 to 10.

3. The foamed rubber according to claim 1, wherein the mixture of the rubber polymer and the hydrocarbon-based oil further consists essentially of oil stearic acid in an amount of 0.5 parts by mass to 8 parts by mass per the 100 parts by mass of the EPDM.

4. The foamed rubber according to claim 1, wherein the mixture of the rubber polymer and the hydrocarbon-based oil further consists essentially of stearic acid in an amount of 2 parts by mass to 5 parts by mass per the 100 parts by mass of the EPDM.

5. The foamed rubber according to claim 1, wherein the mixture of the rubber polymer and the hydrocarbon-based oil further consists essentially of stearic acid in an amount of 0.5 parts by mass to 5 parts by mass per the 100 parts by mass of the EPDM, and a fatty acid ester-based processing aid in an amount of 0.5 parts by mass to 20 parts by mass per the 100 parts by mass of the EPDM.

6. A seal component formed of the foamed rubber according to claim 1.

7. A hose formed of the foamed rubber according to claim 1.

* * * * *